US011981978B2

United States Patent
Tan et al.

(10) Patent No.: US 11,981,978 B2
(45) Date of Patent: May 14, 2024

(54) METHOD FOR PREPARING HIGH-PURITY NICKEL-BASED SUPERALLOY BY ELECTRON BEAM INDUCED REFINING AND CASTING TECHNOLOGY

(71) Applicant: DALIAN UNIVERSITY OF TECHNOLOGY, Liaoning (CN)

(72) Inventors: Yi Tan, Liaoning (CN); Xinpeng Zhuang, Liaoning (CN); Longhai Zhao, Liaoning (CN); Xiaogang You, Liaoning (CN); Pengting Li, Liaoning (CN); Yinong Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 303 days.

(21) Appl. No.: 17/630,905

(22) PCT Filed: Jun. 12, 2020

(86) PCT No.: PCT/CN2020/095726
§ 371 (c)(1),
(2) Date: Jan. 27, 2022

(87) PCT Pub. No.: WO2021/017661
PCT Pub. Date: Feb. 4, 2021

(65) Prior Publication Data
US 2022/0267878 A1 Aug. 25, 2022

(30) Foreign Application Priority Data

Aug. 1, 2019 (CN) .......................... 201910706116.X

(51) Int. Cl.
*B22D 11/116* (2006.01)
*C22B 9/22* (2006.01)
(Continued)

(52) U.S. Cl.
CPC ............ *C22B 9/228* (2013.01); *B22D 11/116* (2013.01); *C22C 1/023* (2013.01); *C22C 19/03* (2013.01)

(58) Field of Classification Search
CPC .............................. B22D 11/116; C22B 9/228
See application file for complete search history.

(56) References Cited

U.S. PATENT DOCUMENTS 3,764,297 A * 10/1973 Coad et al. ............... C22B 9/20
373/16
4,190,404 A 2/1980 Drs et al.
(Continued)

FOREIGN PATENT DOCUMENTS

| CN | 103695659 A | 4/2014 |
| CN | 105695777 A | 6/2016 |

(Continued)

OTHER PUBLICATIONS

Machine translation of CN107385244 A (Year: 2017).*

*Primary Examiner* — Kevin E Yoon
(74) *Attorney, Agent, or Firm* — NKL Law; Allen Xue

(57) ABSTRACT

A method for preparing high-purity nickel-based superalloy includes the steps of: performing electron beam smelting on small cylinders in a first water-cooled copper crucible after preheating an electron gun, and converging the beam to the edge of one side of the ingot; turning on the electron gun again after completely solidifying the ingot, the electron beam spot uniformly and slowly scanning a surface of the ingot from a side opposite to a final beam converging area of the ingot to the final beam converging area of the ingot to ensure that the alloy at a position scanned by the electron beam spot is completely melted, and stopping scanning once scanning to the final converging area of the ingot; casting the molten alloy in the first water-cooled copper crucible to the (Continued)

Figure 1:
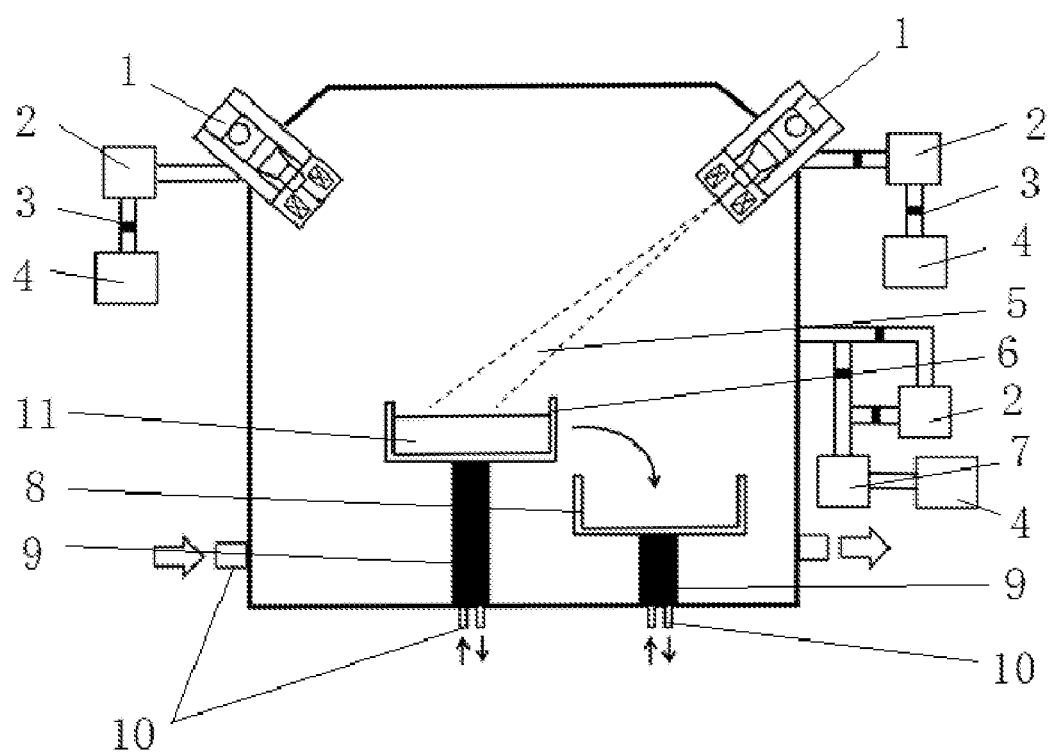

second water-cooled copper crucible; taking out the refined nickel-base superalloy after cooling down the electron beam melting furnace.

8 Claims, 1 Drawing Sheet

(51) Int. Cl.
*C22C 1/02* (2006.01)
*C22C 19/03* (2006.01)

(56) References Cited

U.S. PATENT DOCUMENTS

| | | | |
|---|---|---|---|
| 6,007,597 A | 12/1999 | Puopolo et al. | |
| 6,868,896 B2 * | 3/2005 | Jackson | F27B 3/19 |
| | | | 164/514 |

FOREIGN PATENT DOCUMENTS

| | | | |
|---|---|---|---|
| CN | 107385244 A | 11/2017 | |
| CN | 107574322 A | 1/2018 | |
| CN | 109182843 A | 1/2019 | |
| CN | 110423918 A | 11/2019 | |
| WO | WO-2010068140 A1 * | 6/2010 | C22B 9/226 |

* cited by examiner

METHOD FOR PREPARING HIGH-PURITY NICKEL-BASED SUPERALLOY BY ELECTRON BEAM INDUCED REFINING AND CASTING TECHNOLOGY

TECHNICAL FIELD

The invention relates to a method for preparing an alloy, in particular to a method for preparing a high-purity nickel-based superalloy by electron beam induced refining and casting technology.

BACKGROUND TECHNIQUE

Nickel-based superalloy has been widely used in aviation, aerospace, energy sources, chemical and other industrial fields due to its good high-temperature strength, high-temperature creep property, excellent resistance to oxidation and corrosion, high-temperature fatigue performance, and good long-term structural stability.

At present, the traditional smelting methods of nickel-based superalloy includes duplex melting process such as vacuum induction melting plus arc remelting and vacuum induction melting plus electroslag remelting, and triplex melting process such as vacuum induction melting plus electroslag remelting plus arc remelting and vacuum induction melting plus vacuum arc remelting plus electroslag remelting, and technologies such as plasma remelting, powder metallurgy, electron beam rapid prototyping, and laser cladding molding. Although the multiple melting process, powder metallurgy process, electron beam rapid prototyping and laser cladding process can improve the metallurgical quality of the alloy and reduce the segregation of the ingot, they consume a lot of energy and increase the cost of alloy preparation.

SUMMARY OF THE INVENTION

According to the technical problems raised above, a method for preparing high-purity nickel-based superalloy by electron beam induced refining and casting technology is disclosed. The electron beam refining process uses high-energy electron beams to bombard the surface of the material, which is a smelting method for material melting. It has the characteristics of surface heating and high energy density. In addition, because the water-cooled copper crucible is used during smelting, it avoids the contamination of crucible to the alloy. This technology is widely used in the smelting and purification of high melting point refractory metals and their alloys, solar-grade polysilicon, titanium and titanium alloys. During electron beam refining, by adjusting the melting power, electron beam spot size, electron beam scanning path and other parameters to keep the surface of the alloy melt at a higher melting temperature, the impurity elements can be effectively removed in a high temperature and high vacuum environment. The bottom of the melt is in contact with the water-cooled copper crucible, and the higher cooling rate can reduce the segregation of the alloy. At the end of smelting, the inclusions in the melt can be enriched on the surface of the alloy by reducing the size of the electron beam spot and the melting power. After the melt is solidified and cooled, the surface layer of the ingot is removed by polishing to achieve the object of removing the inclusions. The present invention induces inclusions to be concentrated in the final beam converging area of the alloy edge at the end of electron beam smelting, and then melts and pours the pure melt without inclusions into a water-cooled copper crucible, thereby achieving the object of preparing high-purity nickel-based superalloy. The technical means adopted in the present invention are as follows:

A method for preparing high-purity nickel-based superalloy by electron beam induced refining and casting technology, includes the following steps of:
- S1. Cutting rod-shaped nickel-based superalloy into small cylinders, and cleaning them for later use;
- S2. Cleaning a furnace body of an electron beam smelting furnace, a surface of a first water-cooled copper crucible and a surface of a second water-cooled copper crucible for later use;
- S3. Placing the cleaned small cylinders in the middle of a bottom of the first water-cooled copper crucible, and cleaning the furnace body of the electron beam melting furnace again, and closing a door of the electron beam melting furnace;
- S4. Vacuuming the electron beam smelting furnace to a high vacuum, preheating an electron gun after reaching a vacuum standard;
- S5. Performing electron beam melting on the small cylinders in the first water-cooled copper crucible after preheating the electron gun and converging the electron beam to an edge of one side of a ingot;
- S6. Turning on the electron gun again after completely solidifying the ingot, the electron beam spot uniformly and slowly scanning a surface of the ingot from a side opposite to a final electron beam converging area of the ingot to the final electron beam converging area of the ingot to ensure that the alloy at a position scanned by the electron beam spot is completely melted, and stopping the scanning once scanning to the final electron beam converging area of the ingot;
- S7. Casting the molten alloy obtained in step S6 from the first water-cooled copper crucible to the second water-cooled copper crucible, and finally the solidified alloy containing a large amount of impurities in the converging zone remains in the first water-cooled copper crucible to achieve high-purity melt and impurities Effective separation;
- S8. Taking out the refined nickel-based superalloy after cooling down the electron beam melting furnace.

In step S1, the cleaning includes polishing a surface of the small cylinder with a grinder to remove the stains and oxide scale on the surface, cleaning the polished small cylinder with deionized water and alcohol, and cleaning them with an ultrasonic cleaner, and then drying the small cylinder with a hair dryer.

In steps S2 and S3, the treatment method for cleaning the furnace body of the electron beam smelting furnace is dust removal treatment.

In step S2, the surfaces of the first water-cooled copper crucible and the second water-cooled copper crucible are polished smoothly with 2000# sandpaper, and then wiped with a cotton cloth moistened with alcohol to ensure that the water-cooled copper crucible is clean and pollution-free.

In step S4, the vacuum standard is that a vacuum degree of the electron beam melting furnace body is less than $5 \times 10^{-2}$ Pa, and the vacuum degree of the electron gun chamber is less than $5 \times 10^{-3}$ Pa. The steps of preheating the electron gun includes turning on the electron gun, slowly adjusting the beam current to 120 mA and preheating for 12 min.

The step S5 includes the following steps of:

Reducing the beam current to 0 mA after preheating the electron gun, turning on the high voltage, slowly increasing the beam current to 400 mA within 2 min after the voltage reaching 30 kV and stabilizing for 1 min, wherein the electron beam spot radius is 10×10 (equipment parameters); Keeping the melting power unchanged, gradually melting the small cylinder in the first water-cooled copper crucible by adjusting the scanning path of the electron beam spot; gradually and slowly reducing the beam current after refining for 10 min, and at the same time, gradually reducing the radius of the electron beam spot, to reduce the beam current from 400 mA to 0 mA within 5 min and the electron beam spot radius from 10×10 to 0×0, and converging the electron beam spot to the edge of one side of the ingot.

In step S6, after turning on the electron gun, the beam current is increased to 400 mA, and the electron beam spot radius is 5×5.

In step S6, scanning to a position close to the final electron beam converging area of the ingot and stopping scanning refers to scanning to a position 1 cm from the final electron beam converging area of the ingot and stopping scanning.

In step S8, a method for cooling the electron beam smelting furnace includes introducing argon into and extracting the argon from the electron beam smelting furnace body after cooling the electron beam smelting furnace for 40 min, and then introducing argon into and extracting the argon from the electron beam smelting furnace body again, and cooling the furnace body of the electron beam smelting furnace until completely cooling the furnace body of the electron beam smelting furnace. The introduction of argon helps to speed up the cooling of the ingot.

The present invention has the following advantages:

The invention effectively separates the high-purity alloy melt and impurities on the basis of electron beam refining of nickel-based superalloy. The combination of electron beam induced refining and casting shortens the production cycle of nickel-based superalloy ingot and further improves the purity and metallurgical quality of the ingot. The yield of the alloy has been increased from the traditional 60% to over 85%.

Based on the above reasons, the present invention can be widely promoted in the fields of alloy preparation and the like.

DETAILED DESCRIPTION OF DRAWINGS

To explain the embodiments of the present disclosure or the technical solutions in the prior art more clearly, the following briefly describes the drawings required for describing the embodiments in the present disclosure or the prior art. Apparently, the drawings in the following description show some embodiments of the present disclosure, and those ordinary skilled in the art may still derive other drawings from these drawings without creative efforts.

FIG. 1 is a schematic diagram of equipment for preparing high-purity nickel-based superalloy by electron beam induced refining and casting technology in an embodiment of the present invention.

DETAILED DESCRIPTION OF EMBODIMENTS

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. Based on the embodiments of the present disclosure, all the other embodiments obtained by those of ordinary skill in the art without inventive effort are within the protection scope of the present disclosure.

As shown in FIG. 1, a device for preparing high-purity nickel-based superalloy by electron beam induced refining and casting technology includes electron gun 1, diffusion pump 2, pneumatic valve 3, mechanical pump 4, the first water-cooled copper crucible 6, Roots pump 7, the second water-cooled copper crucible 8, crucible holder 9, and cooling water pipe 10, wherein also includes electron beam 5 and alloy molten pool 11.

A method for preparing high-purity nickel-based superalloy by electron beam induced refining and casting technology includes the following steps:

I. Pretreatment of the Raw Materials

1. The rod-shaped nickel-based superalloy in this embodiment is a rod-shaped 718 alloy with a diameter of 20-50 mm.

2. The rod-shaped 718 alloy is cut into small cylinders with a diameter of 8 mm and a length of 100 mmΦ (100 mm×8 mm), and the surfaces of the small cylinders are polished with a grinder to remove stains and oxide scales on the surfaces.

3. The polished small cylinders are cleaned with deionized water and alcohol, and are cleaned with an ultrasonic cleaner, and then the small cylinders are dried with hair dryer for electron beam smelting.

II. Electron Beam Induced Refining

1. The furnace body of the electron beam smelting furnace is treated to remove dust. The surfaces of the first water-cooled copper crucible 6 and the second water-cooled copper crucible 8 are polished smoothly with 2000# sandpaper, and then the crucibles are wiped with cotton cloth moistened with alcohol to ensure that the water-cooled copper crucibles are clean and pollution-free.

2. The cleaned small cylinders are placed in the middle of the bottom of the first water-cooled copper crucible 6, and the furnace body of the electron beam melting furnace is treated to remove dust again, and then the furnace door is closed after confirming the crucible is clean.

3. The power switches of the cooling water, air compressor, and electron beam melting equipment are turned on. The electron beam melting furnace is and vacuumed. The vacuum degree of the electron beam melting furnace body is less than $5\times10^{-2}$ Pa, and the vacuum degree of the electron gun chamber is less than $5\times10^{-3}$ Pa. When the vacuum degree reaches the standard, turn on the electron gun 1, and slowly adjust the beam current to 120 mA and preheat for 12 min.

4. The beam current is reduced to 0 mA after the electron gun 1 is preheated. The high voltage is turned on, and the beam current is slowly increased to 400 mA within 2 min after the voltage reaches 30 kV and stabilizes for 1 min. The electron beam spot radius is 10×10 (equipment parameters). Keeping the melting power unchanged, the small cylinder in the first water-cooled copper crucible 6 is gradually melted by adjusting the scanning path of the electron beam spot.

5. The beam current is gradually and slowly reduced after 10 min refinement, and at the same time, the radius of the electron beam spot is gradually reduced. The beam current is reduced from 400 mA to 0 mA and the electron beam spot radius from 10×10 to 0×0 within 5 min, and the electron beam spot is converged to the right edge of the ingot (the final electron beam converging area).

III. Alloy Casting

1. The electron gun 1 is turned on again after the ingot is completely solidified. The beam current is increased to 400 mA and the electron beam spot radius is 5×5. The electron beam spot scans the surface of the ingot uniformly and slowly from the left to the right to ensure the alloy at the position scanned by the electron beam spot is completely melted. Once scanning to 1 cm to the left of the final electron beam converging area of the ingot, the scanning is stopped.

2. The molten alloy in the first water-cooled copper crucible 6 is poured to the second water-cooled copper crucible 8, and the solidified alloy containing a large amount of impurities in the final electron beam converging area remains in the first water-cooled copper crucible 6, achieving high purity melt and impurities effective separation.

3. The first water-cooled copper crucible 6 is restored to the original position after casting, the high voltage of the electron gun 1 is turned off, and the electron gun 1 is turned off after the beam current is reduced to 0 mA.

4. Argon is introduced into and is extracted from the electron beam smelting furnace body after the electron beam smelting furnace is cooled for 40 min, and then argon is introduced into and is extracted from the electron beam smelting furnace body again. The electron beam smelting furnace body is completely cooled, and then the refined 718 alloy is taken out.

At last, it should be noted that the above embodiments are only used to illustrate the technical solutions of the present invention, but not to limit them. And despite reference to the aforementioned embodiments to make a detailed description of the present invention, those of ordinary skilled in the art should understand that the described technical solutions in above various embodiments may be modified or the part of or all technical features may be equivalently substituted, while these modifications or substitutions do not make the essence of their corresponding technical solutions deviate from the scope of the technical solutions of the embodiments of the present invention.

The invention claimed is:

1. A method for preparing high-purity nickel-based superalloy by electron beam induced refining and casting technology, comprising the following steps of:
 S1. cutting rod-shaped nickel-based superalloy into small cylinders, and cleaning them for later use;
 S2. cleaning a furnace body of an electron beam smelting furnace, a surface of a first water-cooled copper crucible and a surface of a second water-cooled copper crucible for later use;
 S3. placing the cleaned small cylinders in the middle of a bottom of the first water-cooled copper crucible, and cleaning the furnace body of the electron beam melting furnace, and closing a door of the electron beam melting furnace;
 S4. vacuuming the electron beam smelting furnace to a high vacuum, preheating an electron gun after reaching a predetermined vacuum;
 S5. performing electron beam melting on the small cylinders in the first water-cooled copper crucible after preheating the electron gun, and converging the electron beam to an edge of one side of an ingot;
 S6. turning on the electron gun after completely solidifying the ingot, forming an electron beam spot on a surface of the ingot, wherein the electron beam spot scans a surface of the ingot from a side opposite to a final electron beam converging area of the ingot to the final electron beam converging area of the ingot to ensure that the alloy at a position scanned by the electron beam spot is completely melted, and stopping scanning before reaching the final electron beam converging area of the ingot;
 S7. casting the molten alloy obtained in step S6 from the first water-cooled copper crucible to the second water-cooled copper crucible; and
 S8. taking out a refined nickel-based superalloy after cooling down the electron beam melting furnace,
 wherein step S5 further comprises:
 reducing the beam current to 0 mA after preheating the electron gun, turning on the high voltage, increasing the beam current to 400 mA within 2 min after the voltage reaching 30 kV and stabilizing for 1 min, wherein the electron beam spot radius is 10×10;
 keeping the melting power unchanged, melting the small cylinder in the first water-cooled copper crucible by adjusting the scanning path of the electron beam spot; and
 reducing the beam current after refining for 10 min, and at the same time, reducing the radius of the electron beam spot to reduce the beam current from 400 mA to 0 mA within 5 min and the electron beam spot radius from 10×10 to 0×0, converging the electron beam spot to the edge of one side of the ingot.

2. The method according to claim 1, wherein in step S1, the cleaning comprises polishing a surface of the small cylinder with a grinder, cleaning the polished small cylinder with deionized water, alcohol, and with an ultrasonic cleaner, and then drying the small cylinder with a hair dryer.

3. The method according to claim 1, wherein in steps S2 and S3, the treatment method for cleaning the furnace body of the electron beam melting furnace is dust removal treatment.

4. The method according to claim 1, wherein in step S2, the surfaces of the first water-cooled copper crucible and the second water-cooled copper crucible are polished smoothly with 2000 # sandpaper, and then wiped with a cotton cloth moistened with alcohol.

5. The method according to claim 1, wherein in step S4, the predetermined vacuum is that a vacuum degree of the electron beam melting furnace body is less than $5\times10^{-2}$ Pa, and a vacuum degree of the electron gun chamber is less than $5\times10^{-3}$ Pa;
 wherein preheating the electron gun comprises turning on the electron gun, adjusting the beam current to 120 mA, and preheating for 12 minutes.

6. The method according to claim 1, wherein in step S6, after turning on the electron gun, the beam current is increased to 400 mA, and the electron beam spot radius is 5×5.

7. The method according to claim 1, wherein in step S6, scanning is stopped at a position 1 cm from the final electron beam converging area of the ingot.

8. The method according to claim 1, wherein in step S8, a method for cooling the electron beam smelting furnace comprises introducing argon into and extracting the argon from the electron beam smelting furnace body after cooling the electron beam smelting furnace for 40 min, and then introducing argon into and extracting the argon from the electron beam smelting furnace body again, and cooling the furnace body of the electron beam smelting furnace until cooling completely.

* * * * *